United States Patent [19]

Merz

[11] Patent Number: 4,548,429

[45] Date of Patent: Oct. 22, 1985

[54] RELEASABLE CLAMPING CONNECTION

[75] Inventor: Günther Merz, Neu-Isenburg, Fed. Rep. of Germany

[73] Assignee: Korema GmbH & Co. KG, Fed. Rep. of Germany

[21] Appl. No.: 540,350

[22] Filed: Oct. 11, 1983

[30] Foreign Application Priority Data

Oct. 11, 1982 [EP] European Pat. Off. ........ 82109399.4

[51] Int. Cl.$^4$ ............................................. F16L 21/00
[52] U.S. Cl. .................................. 285/236; 285/229; 285/331; 285/420; 277/184
[58] Field of Search ............... 285/229, 236, 331, 420; 277/212 FB, 184

[56] References Cited

U.S. PATENT DOCUMENTS

| 3,460,856 | 8/1969 | Van Tine et al. | |
| 4,026,585 | 5/1977 | Berghofer | 285/229 |
| 4,155,573 | 5/1974 | Ehlers | 285/229 |
| 4,186,949 | 2/1980 | Bartha et al. | 285/229 |
| 4,293,152 | 10/1981 | Berghofer | 285/229 |
| 4,449,742 | 5/1984 | Toerner | 285/236 |

FOREIGN PATENT DOCUMENTS

| 525453 | 5/1931 | Fed. Rep. of Germany . | |
| 1158776 | 12/1963 | Fed. Rep. of Germany | 285/229 |
| 1963661 | 7/1967 | Fed. Rep. of Germany . | |
| 2638622 | 3/1978 | Fed. Rep. of Germany . | |
| 2748302 | 11/1980 | Fed. Rep. of Germany . | |
| 2092992 | 1/1972 | France . | |
| 1384025 | 2/1975 | United Kingdom . | |

Primary Examiner—Dave W. Arola
Attorney, Agent, or Firm—Antonelli, Terry & Wands

[57] ABSTRACT

A releasable clamping connection for fastening gaskets of pressure-type flexible connections in major installations such as, for example, pipes having large dimensions. Shaped clamping strips are provided for clamping edge beads of gaskets, with each of the edge beads being adapted to be received by a circumferential slotted clamping ring of an elastic material mounted on the gasket. The clamping strips, having a cross sectional configuration complimentary to or matching an outside profile of the clamping ring, are adapted to be pressed against the corresponding clamping ring.

20 Claims, 5 Drawing Figures

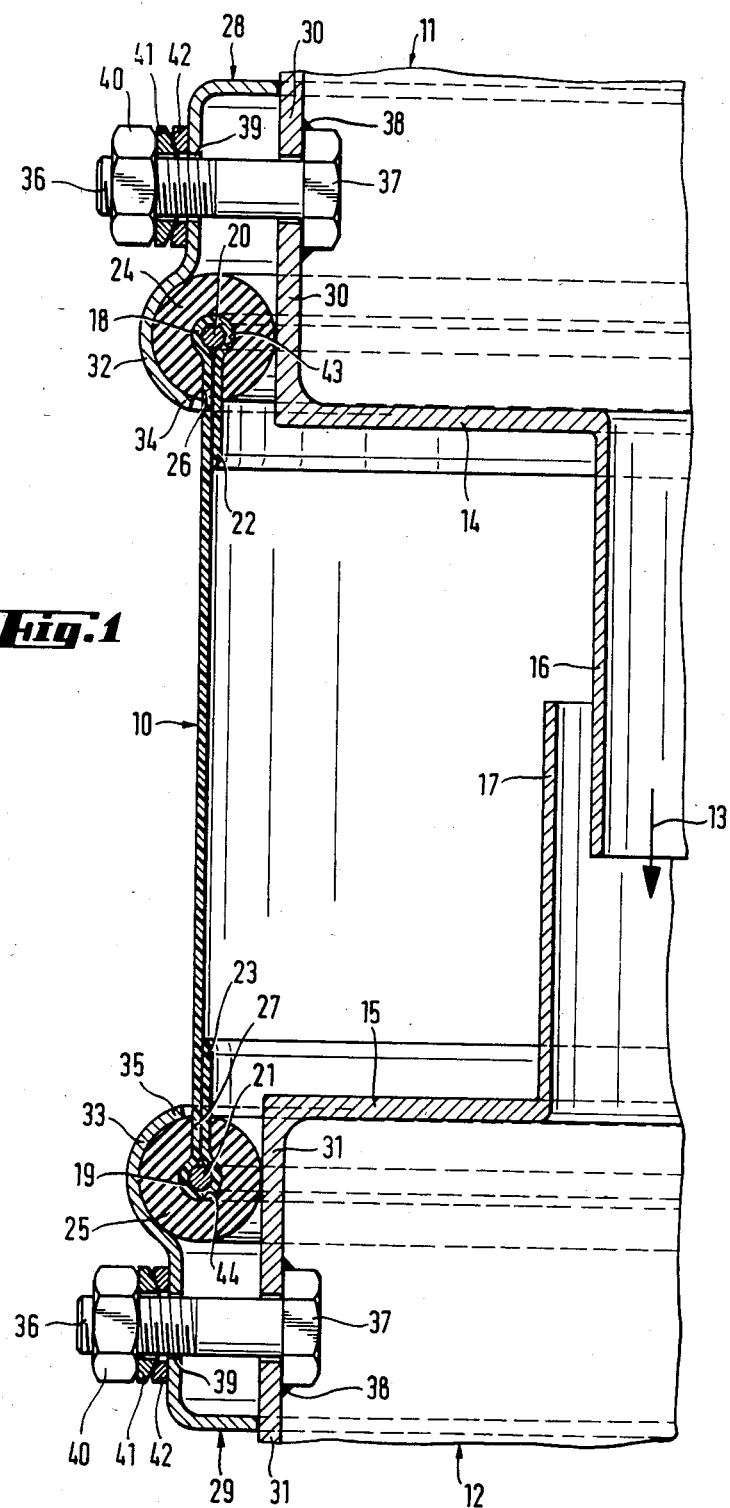

RELEASABLE CLAMPING CONNECTION

The present invention relates to a clamping arrangement and, more particularly, to a releasable clamping connection for fastening gaskets of pressure type flexible connections in major installations such as, for example, large diameter pipes, with shaped clamping strips for clamping edge beads of gaskets. In, for example, Auslegesschrift 1,267,490, and corresponding U.S. Pat. No. 3,460,856 a clamping connection is proposed wherein flat ends of a gasket are clamped between clamping strips by screw connections, with the connections extending through corresponding recesses provided on edge areas of the gasket.

A disadvantage of the above proposed construction resides in the fact that experience has shown that no pressure-tight seal can be achieved in a realiable and reproducible manner over long periods of time with such a proposed clamp connection and, generally, leaks continually occur in a vicinity of the recesses provided in the edge area of the gasket.

In an attempt to overcome the above-noted disadvantage, in, for example, French Pat. No. 2,092,992 and Offenlegungsschrift 26 38 622, releasable clamping connections have been developed wherein shaped clamping strips are provided which are adapted to be tightened by clamping elements, especially screw connections, which are disposed beyond the edge areas of the gaskets so the gasket itself need not be provided with recesses through which the clamping elements are passed. In these last mentioned clamping connections, the shaped clamping strips abut the edge bead in order to clamp the latter between the clamping strip and a pipe wall or pipe flange.

While the last mentioned proposed clamping connections dispense with the need for recesses in the gasket, a disadvantage resides in the fact that it has proven difficult, especially in large diameter pipes, to adjust the clamping force applied by the corresponding clamping elements such as, the screw connections, about a complete circumferential edge of the gasket in such a manner that not only is the desired pressure tightness achieved but also the danger of damage to the gasket is avoided.

The aim underlying the present invention essentially resides in providing a releasable clamping connection by which it is possible, when used in major installations, to ensure reliable pressure tightness in a simple fashion for all dimensions and cross-sections of the major installations.

In accordance with advantageous features of the present invention, an edge bead of a sealing gasket is adapted to be recieved by a circumferential slotted clamping ring made of an elastic material. The clamping ring is mounted on the gasket and a clamping strip is pressed against the clamping ring, with the clamping strip having a cross section matching an outside profile of the clamping ring.

By virtue of the above-noted features of the present invention, the clamping ring grips the edge bead on all side thereof so that it is possible to apply a clamping force in an especially uniform distribution on the edge bead. Thus, any clamping force concentration that might result in damage to the gasket and/or the edge bead can readily be avoided. Moreover, the clamping force may be applied in a problem free manner in the clamping connection to such a degree that the pressure tightness is ensured.

Advantageously, in accordance with still further features of the present invention, the clamping ring may form a cavity having a cross section which is essentially the same as the cross section of the edge bead. In this connection, a clamping ring having an essentially circular cross sectional configuration is especially advantageous. In order to produce large area application and sealing surfaces, the cross sectional dimensions of the clamping ring may advantageously be a multiple of the cross sectional dimension of the edge bead.

The clamping ring may, in accordance with the present invention, be fashioned of a rubber-elastic material such as, for example, silicon rubber, a heat and chemical resistant fluoroelastomer of a vinylidine fluoride, hexafluoropropylene copolymers, or similar materials.

In order to ensure a more even and uniform distribution of the clamping forces, in accordance with still further features of the present invention, the clamping elements formed as screw or bolt type connections are provided with spherical washers and sockets for preferably clamping the clamping strip against the clamping ring. Some of the screw or bolt connections may be fashioned as studs welded to walls of a pipe.

In situations wherein tensile forces are to be exerted by the gasket wall on the edge bead, in a tension state, the slot of the clamping ring through which the portion of the gasket which abuts the edge bead is guided, is, in accordance with the present invention, aligned with the direction of the tensile forces in order to ensure an especially secure seal.

While the elastic clamping ring may simply be pushed over the edge bead of the gasket, preferably, the clamping ring is permanently attached to the edge bead by, for example, welding or adhesives.

In order to produce the edge bead, in accordance with the present invention, an end wall of the edge bead may be upset about an inner core and, advantageously, the inner core is then firmly attached to the gasket wall by, for example, welding or adhesives.

Accordingly, it is an object of the present invention to provide a releasable clamping connection for pressure tight flexible connections which avoids, by simple means, short comings and disadvantages encountered in the prior art.

Another object of the present invention resides in providing a releasable clamping connection for pressure tight flexible connections which is simple in construction and therefore relatively inexpensive to manufacture.

Yet another object of the present invention resides in providing a releasable clamping connection for pressure tight flexible connections which ensures the existence of a realiable pressure-tight seal over relatively long periods of time.

A further object of the present invention resides in providing a releasable clamping connection for pressure tight flexible connection which minimizes if not avoids any damage to the gasket of the connection.

These and other objects, features, and advantages of the present invention will become more apparent from the following description when taken in connection with the accompanying drawings which show, for the purpose of illustration only, one embodiment in accordance with the present invention, and wherein:

FIG. 1 is a cross-sectional view of a releasable clamping connection constructed in accordance with the present invention between a gasket and two ends of opposed facing pipes;

Figure 2A:
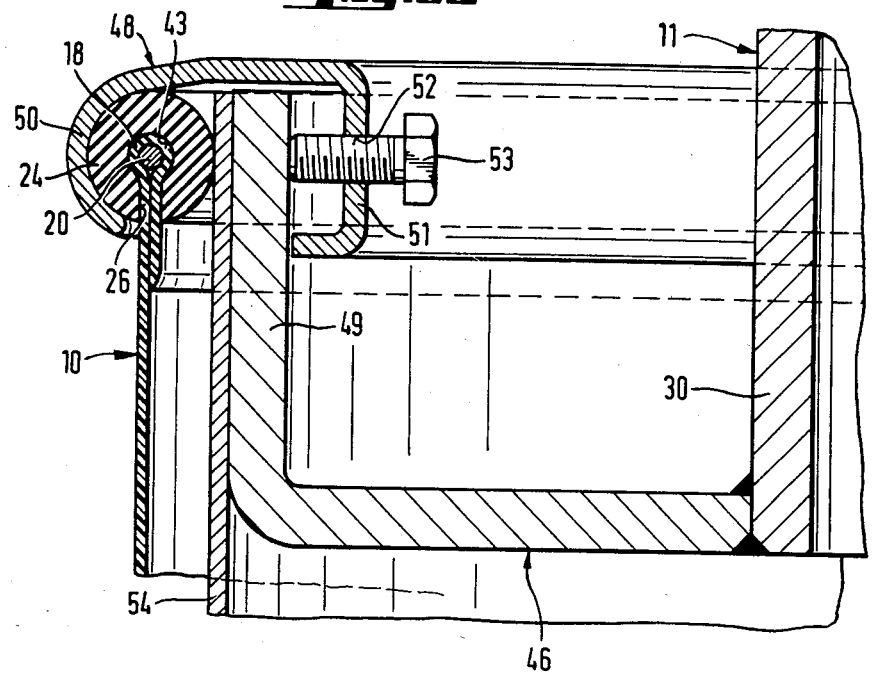
FIG. 2a is a cross-sectional view of another embodiment of a releasable clamping connection constructed in accordance with the present invention.

Referring now to the drawings wherein like reference numerals are used throughout the various views to designate like parts and, more particularly, to FIG. 1, according to this figure, a pressure tight flexible connection is produced by a gasket 10 disposed between ends 11 and 12 of two opposed pipes, with the pipes being adapted to conduct a medium such as, for example, gases containing large amounts of condensate, in the direction indicated by the arrow 13. The ends 11, 12 of the pipes are staggered radially inwardly by shoulder portions 14, 15 and the respective pipes are provided with spacing rings 16, 17.

The gasket 10 is provided at respective axial ends with an edge bead 18, 19, with the edge beads 18, 19 being formed by ends of the wall of the gasket 10 being upset inwardly about an inner core 20, 21, respectively. The inner cores 20, 21 are firmly attached to the gasket wall by, for example, welding or by an adhesive. It is also possible to glue or weld the upset ends 22, 23. Moreover, as can readily be appreciated, the ends 22, 23 instead of being upset inwardly as illustrated in FIG. 1, such ends may be upset outwardly about the inner cores 20, 21.

Each of the edge beads 18, 19 is surrounded by a circumferential slotted clamping ring 24, 25 which is mounted on the gasket 10, with the rings 24, 25 being made of a highly elastic and preferably rubber elastic material having a high resistance to the medium being conducted by the pipes. Slots 26, 27 of the clamping rings 24, 25 through which the portion of the gasket 10 which abuts the edge bead 20, 21, is guided are aligned with an axial direction of the pipes. Clamping strips 28 serve to press the clamping rings 24, 25 against the outer surfaces of the pipe walls 30, 31, with the clamping strips 28, 29 respectively being provided with convex portions 32, 33 which are complimentary or match an outside profile of the clamping rings 24, 25. The clamping strips 28, 29 respectfully terminate in ends 34, 35 which face one another and which terminate, in a circumferential direction of the clamping rings 24, 25 at a distance or spacing from the slots 26, 27 so that the wall of the gasket 10 does not contact the clamping strips 28, 29.

Suitable fastening means are provided for securing the clamping strips 28, 29 to the respective pipes. More particularly, a plurality of bolts may be disposed about a circumference of the pipe ends 11, 12, with a threaded shank portion 36 of the respective bolts extending through holes or recesses (not shown) provided in the walls 30, 31 of the pipes, and with heads 37 of the bolts secured at inner surfaces of the walls 30, 31 by welds 38 in a pressure tight manner. The shank portions 36 extend radially outwardly through recesses or openings 39 in the clamping strips 28, 29, and nuts 40 are threadably attached to the shank portions 36. Spherical washers 41 and conical sockets 42 may be interposed between the nuts 40 and the respective clamping strips 28, 29. As can readily be appreciated, the threaded shank portions 36 may also be formed as threaded studs welded directly to an outer surface of the respective pipe walls 30, 31.

When the nuts 40 are tightened, the clamping rings 24, 25 between segments 32, 33 of the clamping strips 28, 29 and the pipe walls 30, 31 are also tightened so as to produce a pressure tight seal. When the clamping strips 28, 29 are tensioned, the clamping rings 24, 25 are pressed in a sealing fashion in a vicinity of cavities 43, 44 receiving the edge beads 18 and 19 and the adjacent slots 26, 27 are pressed against the edge beads 18, 19 and adjacent parts of the gasket 10. This produces a realiable seal in the area even if the clamping rings 24, 25 are mounted only loosely on the edge beads 18, 19. Preferably, a permanent connection, that is, a connection produced by gluing or welding, is provided between the clamping rings 24, 25 and the portions of the gasket 10 which are engaged by the rings 24, 25. As shown most clearly in FIG. 1, the threaded shank portions 36 lie outside an axial area over which the gasket 10 extends; therefore, it is not necessary to provide the gasket 10 with recesses or openings for enabling the threaded shank portions 36 to pass therethrough.

As apparent from FIG. 1, when a pressure prevailing in the pipes and, consequently, in the gasket 10 increases, a sealing action increases as well because the axial forces acting on the gasket wall attempt to pull the edge beads 18, 19 out of the cavities or chambers 43, 44 into the slots 26, 27, which slots are tapered relative to the cavities or chambers 43, 44. Additionally, the axial forces also attempt to pull the clamping rings, 24, 25 into narrowed passageways between the ends 34, 35 of the clamping strips 28, 29 and pipe walls 30, 31.

Depending upon the particular media conducted by the pipes, the gasket may be made of, for example, fluorohydrocarbon resins (Teflon) and mineral fabric such as, for example, a rubber film with polyester layers or the like. Additionally, coated Kevlar fabric and rubber-like synthetic elastomers made of a sulfochlorinated polyethylene (CSM) and films with reinforcing fabric such as, for example, Hypalon, may be used. If a Hypalon film is used, the film is preferably disposed on the side of the gasket that faces the media being conducted by the pipe because of the acid resistance characteristics thereof while an external reinforcing fabric would ensure a high tear strength. The inner cores 20, 21 may advantageously be made of the same material as the gasket 10 and, with regard to the clamping rings 24, 25, silicon rubber, heat and chemical resistant fluoroelastomers based on vinylidine fluoride-hexafluorolpropylen copolymers (Viton) and rubber-like synthetic elastomers made of sulfochlorinated polyethylene (CSM), for example, Hypalon, are suitable material for such rings. The cross sectional dimension of the clamping rings 24, 25 is advantageously a multiple of the cross sectional dimension of the edge beads 18, 19 and it is possible for clamping ring diameters to be the size of about 40 mm. Depending upon the particular use of application, annular space between the spacing rings 16, 17 and the gasket 10 may be either partially or completely filled with a heat insulating material.

As shown in FIG. 2a, the pipe end 11 may be provided with an angular flange 46, with a substantially J-shaped cross-sectional clamping strip 48 being adapted to be placed over a leg 49 of the angular flange 46, which leg 49 runs substantially parallel to the pipe wall 30. The clamping strip 48 has a cross section 50 which compliments or matches an outside profile of the clamping ring 24 and a leg 51 which is disposed substantially diametrically opposite to the section 50. The leg 51 is provided with a threaded bore 52 for accommodating a clamping fastener 53 such as, for example, a screw, with the clamping fastener being adapted to abut an inner surface of the leg 49. A spacing ring 54 is interposed between the clamping ring 24 and outer surface of the leg 49. In all other respects, the clamping connection of FIG. 2a corresponds to the connection described hereinabove.

Figure 2B:
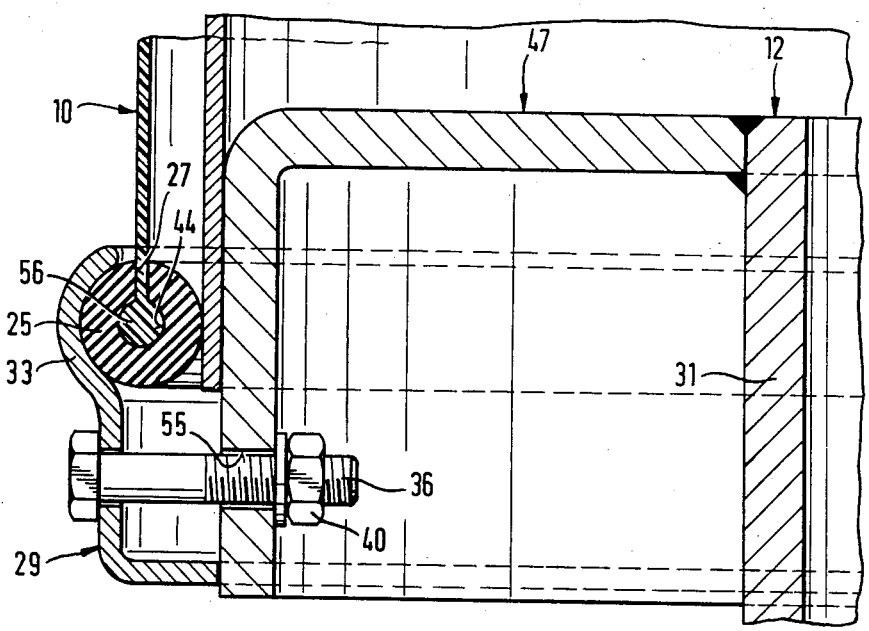
FIG. 2b is a cross-sectional view of a further releasable clamping connection constructed in accordance with the present invention.

As shown in FIG. 2b, a clamping strip, corresponding to the clamping strips 32, 33 in FIG. 1 is provided; however, a shank portion 36 of a bolt is passed through a recess or opening 55. Since the threaded shank portion 36 is sealed off from the interior of the pipe by the clamping ring 25, a pressure tight welding of the bolt or shank portion 36 to the angular flange 47 may be dispensed with. Additionally, in contrast to the constructions described hereinabove, in FIG. 2b, an edge bead 56 is formed directly on the gasket 10.

Figure 3A:
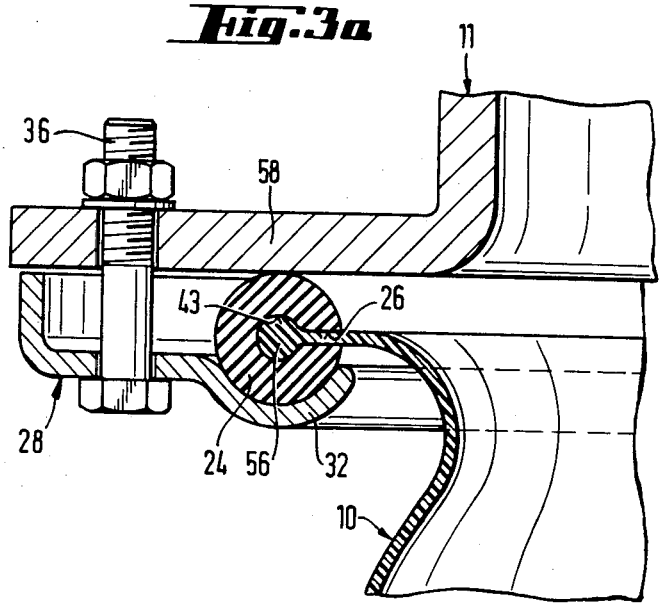
FIG. 3a is a cross-sectional view of yet another releasable clamping connection constructed in accordance with the present invention.

In FIG. 3a, the pipe end 11 is provided with an annular flange 58 which projects radially outwardly of the pipe with the clamping strip 28 being arranged so as to accommodate the clamping ring 24 in such a manner that the slot 26 is disposed substantially perpendicular to an axial direction of the pipes.

Figure 3B:
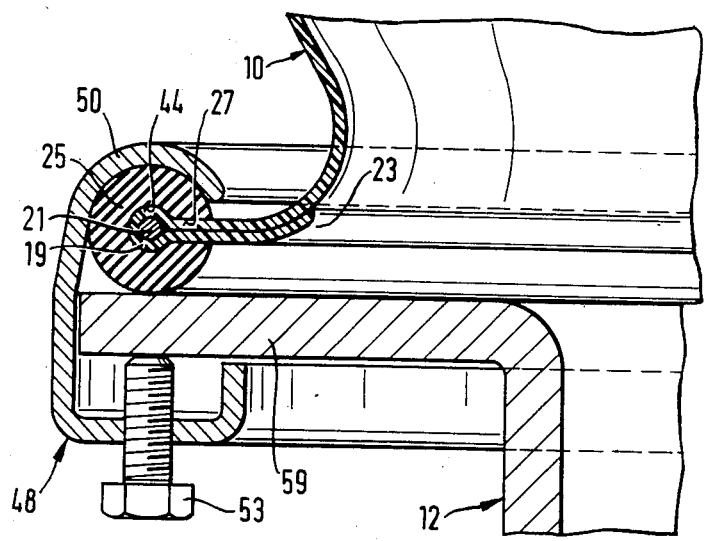
FIG. 3b is a cross-sectional view of anothe releasable clamping connection constructed in accordance with the present invention.

In FIG. 3b, a pipe end 12 is provided with an annular flange 59 which also projects radially outwardly of the pipe with a clamping strip 48 being provided for accommodating a clamping ring 25 in such a manner that the slot 27 of the clamping ring 25 is disposed substantially perpendicular to the axial direction of the pipes. In all other respects, the connections of FIGS. 3a and 3b correspond to the previously described connections.

While I have shown and described several embodiments in accordance with the present invention, it is understood that the same is not limited thereto but is susceptible of numerous changes and modifications as known to one having ordinary skill in the art and I therefore do not wish to be limited to the details shown and desscribed herein, but intend to cover all such modifications as are encompassed by the scope of the appended claims.

I claim:

1. A releasable clamping connection for a pressure tight connection between two elements, the clamping connection comprising a gasket means, an edge bead provided at respective axial ends of said gasket means, a pair of elastic clamping rings each having a slot means for respectively accommodating portions of the axial ends of the gasket means, a clamping means for clamping the respective clamping rings against said edge beads and against portions of the respective elements, said clamping means each including a portion having a cross section complementary to an outside profile of the clamping rings, and means for mounting said clamping means on the respective elements.

2. A releasable clamping connection according to claim 1, wherein said slot means and each of said clamping rings terminate in cavities for accommodating the respective edge beads, said cavities having a cross sectional configuration essentially corresponding to a cross sectional configuration of the edge beads.

3. A releasable clamping connection according to claim 2, wherein each of said clamping rings have a substantially circular cross sectional configuration.

4. A releasable clamping connection according to claim 3, wherein each of said clamping rings have a cross sectional dimension which is a multiple of a cross sectional dimension of the respective edge beads.

5. A releasable clamping connection according to claim 4, wherein each of the clamping rings is made of a rubber-elastic material.

6. A releasable clamping connection according to claim 4, wherein each of the clamping rings is made of a material selected from synthetic and natural elastomers.

7. A releasable clamping connection according to claim 1, wherein said means for mounting includes threaded fastener means for pressing the clamping means against the clamping rings.

8. A releasable clamping connection according to claim 7, wherein said threaded fastener means includes a threaded shank portion and a nut adapted to be mounted thereon, and wherein a spherical washer means and conical socket means are interposed between the nut and the respective clamping means.

9. A releasable clamping connection according to claim 8, wherein said threaded shank portions are fixedly secured to walls of the two elements.

10. A releasable clamping connection according to claim 1, wherein said clamping rings are accommodated in the respective clamping means in such a manner that, in a clamped condition, the slot means of the respective clamping rings are disposed in substantial alignment with tensile forces acting on the edge beads.

11. A releasable clamping connection according to claim 1, wherein the respective clamping rings are firmly secured to the edge beads.

12. A releasable clamping connection according to claim 1, wherein the respective edge beads include an inner core surrounded by a terminal end of the gasket means.

13. A releasable clamping connection according to claim 12, wherein the inner core is firmly attached to inner surfaces of the gasket means.

14. A releasable clamping connection according to claim 1, wherein each of the clamping rings is made of a rubber-elastic material.

15. A releasable clamping connection according to claim 1, wherein each of the clamping rings is made of a material selected from synthetic and natural elastomers.

16. A releasable clamping connection according to claim 1, wherein the two elements are pipe means for conducting a medium therethrough, each of said pipe means including a wall portion extending substantially parallel to the longitudinal center axis of said pipe means, each of said clamping means including a clamping strip adapted to be releasably secured to said wall portion by said means for mounting.

17. A releasable clamping connection according to claim 16, wherein each of said clamping strips have a substantially J-shaped configuration and include a leg portion extending substantially parallel to the respective wall portions, and wherein said means for mounting includes a threaded bore provided in said leg portion and a threaded fastener means mounted in said threaded bore such that an end portion of the fastener means engages an inner surface of the respective wall portions.

18. A releasable clamping connection according to claim 1, wherein said gasket means includes at least one layer of a fluorohydrocarbon.

19. A releasable clamping connection according to claim 1, wherein said gasket means is formed of a mineral fabric including at least one layer of a rubber material and at least one layer of a polyester material.

20. A releasable clamping connection according to claim 1, wherein said mounting means are disposed on an area spaced from the axial ends of said gasket means.

* * * * *